(12) United States Patent
Wu et al.

(10) Patent No.: US 9,957,959 B2
(45) Date of Patent: May 1, 2018

(54) LINEAR PROGRAMMING-BASED APPROACH TO SCHEDULING OF CRUDE OIL OPERATIONS IN REFINERY FOR ENERGY EFFICIENCY OPTIMIZATION

(71) Applicant: Macau University of Science and Technology, Macau (MO)

(72) Inventors: Naiqi Wu, Macau (MO); Zhiwu Li, Macau (MO)

(73) Assignee: Macau University of Science and Technology, Macau (MO)

( * ) Notice: Subject to any disclaimer, the term of this patent is extended or adjusted under 35 U.S.C. 154(b) by 274 days.

(21) Appl. No.: 14/919,706

(22) Filed: Oct. 21, 2015

(65) Prior Publication Data
US 2017/0083028 A1    Mar. 23, 2017

Related U.S. Application Data

(60) Provisional application No. 62/221,032, filed on Sep. 20, 2015.

(51) Int. Cl.
*G05D 7/06* (2006.01)
*G05B 15/02* (2006.01)
(Continued)

(52) U.S. Cl.
CPC ............ *F04B 49/065* (2013.01); *F04B 23/04* (2013.01); *G06Q 10/0631* (2013.01);
(Continued)

(58) Field of Classification Search
CPC .. G05D 7/0682; G05B 15/02; G06Q 10/0631; F04B 23/04; F04B 49/065; F04B 2205/09; F04B 2207/041; Y02P 80/10
(Continued)

(56) References Cited

U.S. PATENT DOCUMENTS

| 2004/0011505 A1* | 1/2004 | Park | F24D 3/04 165/58 |
| 2010/0312400 A1* | 12/2010 | Steffensen | G05B 13/0265 700/282 |
| 2012/0206595 A1* | 8/2012 | Alphenaar | F17D 3/00 348/135 |

FOREIGN PATENT DOCUMENTS

AU    20014100521    *  6/2014    ............. G06Q 99/00

OTHER PUBLICATIONS

Wu et al "Energy efficiency optimization in scheduling crude oil operations of refinery based on linear programming", Jul. 31, 2017, pp. 49-57.*

(Continued)

*Primary Examiner* — Miranda M Huang
*Assistant Examiner* — Olvin Lopez Alvarez
(74) *Attorney, Agent, or Firm* — Spruson & Ferguson (Hong Konh) Limited

(57) ABSTRACT

For sustainable development, a refinery is required to save energy as much as possible so as to reduce the emission of greenhouse gas. In crude oil operations, oil transportation from storage tanks to charging tanks via a pipeline consumes a large portion of energy. It is vitally important to minimize energy consumption for this process. Since the oil flow resistance is proportional to the square of oil flow rate, the relation between energy efficiency and flow rate is nonlinear, which makes the problem complicated. The present invention addresses this important issue by formulating a linear programming model for the considered problem such that it can be efficiently solved. A real-world industrial case study is used to demonstrate the applications and significance of the proposed method.

6 Claims, 6 Drawing Sheets

(51) Int. Cl.
F04B 49/06 (2006.01)
G06Q 10/06 (2012.01)
F04B 23/04 (2006.01)
(52) U.S. Cl.
CPC ..... F04B 2205/09 (2013.01); F04B 2207/041 (2013.01); Y02P 80/10 (2015.11); Y02P 90/86 (2015.11)
(58) Field of Classification Search
USPC ...................................................... 700/282
See application file for complete search history.

(56) References Cited

OTHER PUBLICATIONS

Cafaro et al, "MINLP model for the detailed scheduling of refined products pipelines with flow rate dependent pumping costs", May 22, 2014, pp. 210-221.*
Magatao, "Sequencing Inputs to a Multi-Product Pipeline", Sep. 2001, pp. 2152-2157.*
Hou et al, "Modeling and Optimization for Short-Term Scheduling of Crude Oil Operations in Refinery", Apr. 2015, pp. 264-270.*
Hazel et al, "Optimization of Pipeline Energy Consumption", 2012, pp. 9.*
C. A. Floudas and X. Lin, Continuous-time versus discrete-time approaches for scheduling of chemical processes: a review, Computers and Chemical Engineering, vol. 28, 2109-2129, 2004.
K. C. Furman, Z. Jia, and M. G. Ierapetritou, A robust event-based continuous time formulation for tank transfer scheduling, Industrial & Engineering Chemical Research, vol. 46, 9126-9136, 2007.
K. Glismann and G. Gruhn, "Short-term scheduling and recipe optimization of blending processes," Computers and Chemical Engineering, vol. 25, 627-634, 2001.
H. Lee, J. M. Pinto, I. E. Grossmann, and S. Park, "Mixed integer linear programming model for refinery short-term scheduling of crude oil unloading with inventory management," Industrial and Engineering Chemistry Research, vol. 35, 1630-1641, 1996.
Z. Jia and M. Ierapetritou, Efficient short-term scheduling of refinery operations based on a continuous time formulation, Computers and Chemical Engineering, vol. 28, 1001-1019, 2004.
Z. Jia, M. Ierapetritou, and J. D. Kelly, Refinery short-term scheduling using continuous time formation: crude oil operations, Industrial and Engineering Chemical Research, vol. 42, 3085-3097, 2003.
R. Karuppiah, K. C. Furmanb, and I. E. Grossmann, Global optimization for scheduling refinery crude oil operations, computers and Chemical Engineering, vol. 32, 2745-2766, 2008.
W. K. Li, W. H. Chi, and B. Hua, Scheduling crude oil unloading, storage, and processing, Industrial and Engineering Chemistry Research, vol. 41, 6723-6734, 2002.
C. A. Mendez, I. E. Grossmann, I. Harjunkoski, and P. Kabore, "A simultaneous optimization approach for off-line blending and scheduling of oil-refinery operations", Computers & Chemical Engineering, vol. 30, No. 4, 614-634, 2006.
L. F. L. Moro, Process technology in the petroleum refining industry—current situation and future trends, Computers & Chemical Engineering, vol. 27, 1303-1305, 2003.
S. Mouret, I. E. Grossmann, and P. Pestiaux, Time representations and mathematical models for process scheduling problems, Computers and Chemical Engineering, vol. 35, No. 6, 1038-1063, 2010.
J. M. Pinto, M. Joly and L. F. L. Moro, Planning and scheduling models for refinery operations, Computers and Chemical Engineering, vol. 24, No. 9, 2259-2276, 2000.
R. Rejowski and J. M. Pinto, Scheduling of a multiproduct pipeline system, Computers and Chemical Engineering, vol. 27, No. 8-9, 1229-1246, 2003.

G. K. D. Saharidisa, M. Minoux, and Y. Dallery, Scheduling of loading and unloading of crude oil in a refinery using event-based discrete time formulation, Computers and Chemical Engineering, vol. 33, 1413-1426, 2009.
N. Shah, Mathematical programming techniques for crude oil scheduling, Computers and Chemical Engineering, vol. 20, Suppl. S1227-1232, 1996.
N. Shah, G. K. D. Saharidis, Z. Jia, and M. G. Ierapetritou, Centralized—decentralized optimization for refinery scheduling, Computers and Chemical Engineering, vol. 33, 2091-2105, 2009.
N. Q. Wu, L. P. Bai, and C. B. Chu, Modeling and conflict detection of crude-oil operations for refinery process based on controlled-colored-timed Petri net, IEEE Transactions on Systems, Man, & Cybernetics, Part C, vol. 37, No. 4, 461-472, 2007.
N. Q. Wu, L. P. Bai, M. C. Zhou, F. Chu, and S. Mammar, A novel approach to optimization of refining schedules for crude oil operations in refinery, IEEE Transactions on Systems, Man, & Cybernetics, Part C, vol. 42, No. 6, 1042-1053, 2012.
N. Q. Wu, L. P. Bai, and M. C. Zhou, An efficient scheduling method for crude oil operations in refinery with crude oil type mixing requirements, IEEE Transactions on Systems, Man, & Cybernetics: Systems, in press, DOI: 10.11091 TSMC.2014.2332138, 2015a.
N. Q. Wu, C. B. Chu, F. Chu, and M. C. Zhou, Schedulability analysis of short-term scheduling for crude oil operations in refinery with oil residency time and charging-tank-switch-overlap constraints, IEEE Transactions on Automation Science and Engineering, vol. 8, No. 1, 190-204, 2011.
N. Q. Wu, F. Chu, C. B. Chu, and M. C. Zhou, Short-term schedulability analysis of crude oil operations in refinery with oil residency time constraint using Petri net, IEEE Transactions on Systems, Man, and Cybernetics, Part C, vol. 38, No. 5, 765-778, 2008a.
N. Q. Wu, F. Chu, C. B. Chu, and M. C. Zhou, Short-term schedulability analysis of multiple distiller crude oil operations in refinery with oil residency time constraint, IEEE Transactions on Systems, Man, and Cybernetics, Part C, vol. 39, No. 1, 1-16, 2009.
N. Q. Wu, F. Chu, C. B. Chu, and M. C. Zhou, Hybrid Petri net modeling and schedulability analysis of high fusion point oil transportation under tank grouping strategy for crude oil operations in refinery, IEEE Transactions on Systems, Man, and Cybernetics, Part C, vol. 40, No. 2, 159-175, 2010a.
N. Q. Wu, F. Chu, C. B. Chu, and M. C. Zhou, Tank cycling and scheduling analysis of high fusion point oil transportation for crude oil operations in refinery, Computers & Chemical Engineering, vol. 34, No. 4, 529-543, 2010b.
N. Q. Wu, M. C. Zhou, L. P. Bai, and Z. W. Li, Short-term scheduling of crude oil operations in refinery with high fusion point oil and two transportation pipelines, Enterprise Information Systems, in press, DOI: 10.1080/17517575.2014.948936, 2015b.
N. Q. Wu, M. C. Zhou, and F. Chu, "Short-term scheduling for refinery process: bridging the gap between theory and applications," International Journal of Intelligent Control and Systems, vol. 10, No. 2, pp. 162-174, Jun. 2005.
N. Q. Wu, M. C. Zhou, and F. Chu, A Petri net based heuristic algorithm for realizability of target refining schedule for oil refinery, IEEE Transactions on Automation Science and Engineering, vol. 5, No. 4, 661-676, 2008b.
N. Q. Wu, M. C. Zhou, and Z. W. Li, Short-term scheduling of crude-oil operations: Petri net-based control-theoretic approach, IEEE Robotics and Automation Magazine, vol. 22, No. 2, 64-76, Jun. 2015.
U. Yuzgee, A Palazoglu, and J. A. Romagnoli, Refinery scheduling of crude oil unloading, storage and processing using model predictive control strategy, Computers and Chemical Engineering, vol. 34, 1671-1686, 2010.

* cited by examiner

LINEAR PROGRAMMING-BASED APPROACH TO SCHEDULING OF CRUDE OIL OPERATIONS IN REFINERY FOR ENERGY EFFICIENCY OPTIMIZATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of U.S. Provisional Patent Application No. 62/221,032, filed on Sep. 20, 2015, which is incorporated by reference herein in its entirety.

FIELD OF THE INVENTION

The present invention relates to a method for scheduling crude oil operations in refinery. More particularly, the present invention relates to a method for scheduling crude oil operations in refinery for energy efficiency optimization.

BACKGROUND

The following references are cited in the specification. Disclosures of these references are incorporated herein by reference in their entirety.

LIST OF REFERENCES

Aspen Technology Inc., PIMS system reference, version 11.0, Cambridge, Mass., USA, 1999.

Bonner & Moore. RPMS (Refinery and Petrochemical Modeling System): a system descriptive, Houston, Tex., USA: Bonner & Moore Management Science, 1979.

C. A. Floudas and X. Lin, Continuous-time versus discrete-time approaches for scheduling of chemical processes: a review, *Computers and Chemical Engineering*, vol. 28, 2109-2129, 2004.

K. C. Furman, Z. Jia, and M. G. Ierapetritou, A robust event-based continuous time formulation for tank transfer scheduling, *Industrial & Engineering Chemical Research*, vol. 46, 9126-9136, 2007.

K. Glismann and G. Gruhn, "Short-term scheduling and recipe optimization of blending processes," *Computers and Chemical Engineering*, vol. 25, 627-634, 2001.

H. Lee, J. M. Pinto, I. E. Grossmann, and S. Park, "Mixed integer linear programming model for refinery short-term scheduling of crude oil unloading with inventory management," *Industrial and Engineering Chemistry Research*, vol. 35, 1630-1641, 1996.

Z. Jia and M. Ierapetritou, Efficient short-term scheduling of refinery operations based on a continuous time formulation, *Computers and Chemical Engineering*, vol. 28, 1001-1019, 2004.

Z. Jia, M. Ierapetritou, and J. D. Kelly, Refinery short-term scheduling using continuous time formation: crude oil operations, *Industrial and Engineering Chemical Research*, vol. 42, 3085-3097, 2003.

R. Karuppiah, K. C. Furmanb, and I. E. Grossmann, Global optimization for scheduling refinery crude oil operations, *Computers and Chemical Engineering*, vol. 32, 2745-2766, 2008.

W. K. Li, W. H. Chi, and B. Hua, Scheduling crude oil unloading, storage, and processing, *Industrial and Engineering Chemistry Research*, vol. 41, 6723-6734, 2002.

C. A. Mendez, I. E. Grossmann, I. Harjunkoski, and P. Kabore, "A simultaneous optimization approach for off-line blending and scheduling of oil-refinery operations", *Computers & Chemical Engineering*, vol. 30, no. 4, 614-634, 2006.

L. F. L. Moro, Process technology in the petroleum refining industry—current situation and future trends, *Computers & Chemical Engineering*, vol. 27, 1303-1305, 2003.

S. Mouret, I. E. Grossmann, and P. Pestiaux, Time representations and mathematical models for process scheduling problems, *Computers and Chemical Engineering*, vol. 35, no. 6, 1038-1063, 2010.

J. M. Pinto, M. Joly, and L. F. L. Moro, Planning and scheduling models for refinery operations, *Computers and Chemical Engineering*, vol. 24, no. 9, 2259-2276, 2000.

R. Rejowski and J. M. Pinto, Scheduling of a multiproduct pipeline system, *Computers and Chemical Engineering*, vol. 27, no. 8-9, 1229-1246, 2003.

G. K. D. Saharidisa, M. Minoux, and Y. Dallery, Scheduling of loading and unloading of crude oil in a refinery using event-based discrete time formulation, *Computers and Chemical Engineering*, vol. 33, 1413-1426, 2009.

N. Shah, Mathematical programming techniques for crude oil scheduling, Computers and Chemical Engineering, vol. 20, Suppl. S1227-1232, 1996.

N. Shah, G. K. D. Saharidis, Z. Jia, and M. G. Ierapetritou, Centralized-decentralized optimization for refinery scheduling, *Computers and Chemical Engineering*, vol. 33, 2091-2105, 2009.

N. Q. Wu, L. P. Bai, and C. B. Chu, Modeling and conflict detection of crude-oil operations for refinery process based on controlled-colored-timed Petri net, *IEEE Transactions on Systems, Man, & Cybernetics, Part C*, vol. 37, no. 4, 461-472, 2007.

N. Q. Wu, L. P. Bai, M. C. Zhou, F. Chu, and S. Mammar, A novel approach to optimization of refining schedules for crude oil operations in refinery, *IEEE Transactions on Systems, Man, & Cybernetics, Part C*, vol. 42, no. 6, 1042-1053, 2012.

N. Q. Wu, L. P. Bai, and M. C. Zhou, An efficient scheduling method for crude oil operations in refinery with crude oil type mixing requirements, *IEEE Transactions on Systems, Man, & Cybernetics: Systems*, in press, DOI: 10.1109/TSMC.2014.2332138, 2015a.

N. Q. Wu, C. B. Chu, F. Chu, and M. C. Zhou, Schedulability analysis of short-term scheduling for crude oil operations in refinery with oil residency time and charging-tank-switch-overlap constraints, *IEEE Transactions on Automation Science and Engineering*, vol. 8, no. 1, 190-204, 2011.

N. Q. Wu, F. Chu, C. B. Chu, and M. C. Zhou, Short-term schedulability analysis of crude oil operations in refinery with oil residency time constraint using Petri net, *IEEE Transactions on Systems, Man, and Cybernetics, Part C*, vol. 38, no. 6, 765-778, 2008a.

N. Q. Wu, F. Chu, C. B. Chu, and M. C. Zhou, Short-term schedulability analysis of multiple distiller crude oil operations in refinery with oil residency time constraint, *IEEE Transactions on Systems, Man, and Cybernetics, Part C*, vol. 39, no. 1, 1-16, 2009.

N. Q. Wu, F. Chu, C. B. Chu, and M. C. Zhou, Hybrid Petri net modeling and schedulability analysis of high fusion point oil transportation under tank grouping strategy for crude oil operations in refinery, *IEEE Transactions on Systems, Man, and Cybernetics, Part C*, vol. 40, no. 2, 159-175, 2010a.

N. Q. Wu, F. Chu, C. B. Chu, and M. C. Zhou, Tank cycling and scheduling analysis of high fusion point oil transportation for crude oil operations in refinery, *Computers & Chemical Engineering*, vol. 34, no. 4, 529-543, 2010b.

N. Q. Wu, M. C. Zhou, L. P. Bai, and Z. W. Li, Short-term scheduling of crude oil operations in refinery with high fusion point oil and two transportation pipelines, *Enterprise Information Systems*, in press, DOI: 10.1080/17517575.2014.948936, 2015b.

N. Q. Wu, M. C. Zhou, and F. Chu, "Short-term scheduling for refinery process: bridging the gap between theory and applications," *International Journal of Intelligent Control and Systems*, Vol. 10, No. 2, pp. 162-174, June 2005.

N. Q. Wu, M. C. Zhou, and F. Chu, A Petri net based heuristic algorithm for realizability of target refining schedule for oil refinery, *IEEE Transactions on Automation Science and Engineering*, vol. 5, no. 4, 661-676, 2008b.

N. Q. Wu, M. C. Zhou, and Z. W. Li, Short-term scheduling of crude-oil operations: Petri net-based control-theoretic approach, *IEEE Robotics and Automation Magazine*, vol. 22, no. 2, 64-76, June 2015.

U. Yuzgee, A Palazoglu, and J. A. Romagnoli, Refinery scheduling of crude oil unloading, storage and processing using model predictive control strategy, *Computers and Chemical Engineering*, vol. 34, 1671-1686, 2010.

Facing with global and increasingly intensive market competition, a plant in the process industry has to be well operated such that it is competitive. It is known that, with advanced information technology applied to modify the operations, a process plant can be made more profitable [Moro, 2003]. During the last two decades, extensive attention from academia and industry community has been paid to the optimization of the operations in refineries, a type of most important process industries. A refinery can be operated in a hierarchical way with three layers: production planning, short-term scheduling, and unit control at the upper, middle, and lower layers, respectively. With linear programming-based commercial software tools, such as PIMS (Process Industry Modeling System) [Aspen Technology Inc., 1999] and RPMS (Refinery and Petrochemical Modeling System) [Bonner and Moore, 1979], an optimal plan can be efficiently found at the upper layer. Meanwhile, at the lower layer, advanced process control techniques are widely realized for unit control in refineries, resulting in significant productivity improvement. However, thanks to the lack of efficient techniques and software tools for short-term scheduling at the middle layer, the three layers cannot be integrated such that a global optimum cannot be achieved and a short-term schedule has to be obtained manually by a planner.

Since the operation in a refinery contains a discrete-event process, its short-term scheduling problem is essentially combinatorial and NP-hard [Floudas and Lin, 2004]. Moreover, to obtain such a schedule, one needs to define activities to be performed and sequence them simultaneously, leading to the fact that the widely used heuristics and meta-heuristics cannot be applied since these methods require that the jobs to be scheduled should be known in advance. Hence, mathematical programming models are adopted to formulate the scheduling problem of a refinery with two categories, namely discrete and continuous-time representations.

By discrete-time representation, the scheduling horizon is discretized into a number of uniform slots such that the scheduling problem can be formulated as a mixed integer linear programming (MILP) model [Shah, 1996; Lee et al., 1996; Pinto et al., 2000; Glismann and Gruhn, 2001; Jia et al., 2003; Rejowski and Pinto, 2003; Saharidisa et al., 2009; Mendez et al., 2006; and Yuzgee, 2010]. To make a schedule obtained by such a model practically applicable, the time duration for the time slots should be short enough, leading to a huge number of discrete variables for a practical application problem. Hence, it is almost impossible to be solved by the existing software tools [Floudas et al., 2004; and Wu et al., 2011].

To make the problem computationally tractable and solvable, models with continuous time-representation are developed such that the time for the start and end of an event can be found [Jia et al., 2003; Jia and Ierapetritou, 2004; Karuppiah et al., 2008; Li et al., 2002; Mouret et al., 2010; and Shah et al., 2009]. By such a model, it is indeed that the number of discrete variables can be significantly reduced. Nevertheless, it pays an expense of introducing non-linear constraints, resulting in a mixed integer non-linear programming (MINLP) model that is intractable. Hence, its solution process is made to be dramatically complicated. Furthermore, in order to build such a model, one needs to decide the number of operations to be performed in advance, which is unrealistic for practical applications in general [Floudas and Lin, 2004].

In addition to different modeling methods, efforts have been made to improve computational efficiency by developing solution methods. For example, event-based methods [Yuzgee et al., 2010; and Furman et al., 2007], an outer-approximation algorithm [Karuppiah et al., 2008], a decomposition algorithm [Shah et al., 2009], and a priority-slot-based method [Mouret et al., 2010] are used to achieve the tractability purpose. Indeed, the aforementioned solution methods can reduce the computation requirements to some extent. However, all these methods belong to enumeration in nature. With the NP-hard nature of the problem, they cannot resolve the computational complexity problem for real-life applications. To make the problem formulated by mathematical programming models solvable, in modeling, some constraints are ignored, which, unfortunately, results in an inefficient or unrealistic schedule for real-life scenarios [Mendez et al., 2006]. This means that there is a gap between academic research and applications.

To bridge such a gap, the key is to develop a computationally efficient approach for a good solution other than an exactly optimal solution. Notice that, with a large number of discrete variables, the solution space is very large. On the other hand, with a large number of constraints for the problem, the feasible solution space must be small. Thus, it is extremely difficult to solve such a problem by any enumeration method. With this observation, a Petri net-based control-theoretic approach for crude oil operations is proposed [Wu et al., 2008a, 2009, and 2015c]. By this approach, the dynamic behavior of the process is modeled with a hybrid Petri net model by treating the plant as a hybrid system with the interaction of discrete-event and continuous processes [Wu et al., 2007 and 2008b]. From the viewpoint of control theory, schedulability is analyzed to establish schedulability conditions for different scenarios [Wu et al., 2008a, 2009, 2010a and b, 2011, and 2015b]. These conditions determine the feasible space, i.e., the feasibility conditions, such that the problem can be decomposed into two sub-problems: refining scheduling and detailed scheduling. At the upper level, one needs to find a refining schedule by optimizing certain objectives, while, at the lower level, a detailed schedule is created for a given refining one. With the schedulability conditions as constraints, the refining scheduling problem can be solved to obtain a realizable and optimal refining schedule by using linear programming-based methods [Wu et al., 2012 and 2015a]. Then, given a realizable and optimal refining schedule, a detailed schedule to realize it can be found in a recursive way [Wu et al., 2008a, 2009, 2010a and b, 2011, and 2015b]. Accordingly, a short-term schedule for crude oil operations can be efficiently found although it may not be globally optimal.

With continuous climate change resulting from anthropogenic greenhouse gas emissions, there is a great concern on energy saving for sustainable development. It is well-known that process industries are characterized by high energy consumption. It is vitally important to minimize energy consumption in operating a refinery. In the existing studies on scheduling crude oil operations, a variety of objectives are optimized. They include: 1) minimizing cost resulting from crude oil inventory, oil tanker waiting, and oil unloading [Lee et al., 1996; Jia et al., 2003 and 2004]; 2) maximizing productivity [Pinto et al., 2000; and Wu et al., 2012 and 2015a] and minimizing the number of tanks used [Pinto et al., 2000]; 3) minimizing the number of oil type switches in oil transportation via a pipeline [Lee et al., 1996]; 4) minimizing the remaining oil in a tank when it is unloaded [Shah, 1996]; and 5) maximizing the processing effectiveness of different oil types by different distillers [Wu et al., 2012 and 2015a]. However, as far as the authors know, there is no research report on how to save energy in scheduling crude oil operations. This motivates us to conduct this study.

As pointed out in [Wu et al., 2005], in crude oil operations, crude oil transportation from storage tanks to charging tanks via a pipeline consumes a large portion of energy. In order to save energy in the process of crude oil operations, it is significant to minimize the energy consumption for oil transportation, which is the objective of the present invention.

Generally, in a refinery, crude oil is transported from storage tanks to charging tanks via a pipeline. When delivering liquid material through a pipeline, the flow resistance in a pipeline is proportional to the square of fluid velocity. Hence, the transportation rate of the pipeline is not proportional to the power applied, in other words, the energy consumption is non-linear with respect to oil delivering flow rate. This makes the problem of optimizing the energy efficiency in oil transportation very complicated.

SUMMARY OF THE INVENTION

To tackle this issue, a linear programming-based approach is proposed to minimize the energy consumption in crude oil operations. It is done as follows: a short-term schedule is found with the maximal flow rate of the pipeline to maximize the productivity without taking energy efficiency into account. This problem can be efficiently solved by the Petri net-based theoretic-control approach proposed in [Wu et al., 2008a, 2009, and 2012]. Based on the obtained schedule, the present invention minimizes the energy consumption for oil transportation via a pipeline. A linear programming-based technique is developed to solve it. By doing so, non-linearity is avoided and it is computationally very efficient.

An aspect of the present invention is to provide a method for scheduling crude oil operations in refinery for energy efficiency optimization.

According to an embodiment of the present invention, a computer-implemented method for scheduling a crude oil operation process in a refinery, the oil operation process comprising one or more tasks DTSs for oil delivering from one or more storage tanks to one or more charging tanks, the refinery comprising a pipeline system used to transport crude oil from the storage tanks to the charging tanks, the pipeline system comprising a pipeline and a number of pumping stations, and a number of sets of machines in each of the pumping stations, the method comprising:

determining, by a processor, the number of sets of machines n usable at each of the pumping stations, by minimizing energy consumption J for the process based on a linear programming model as follow:

$$\text{Minimize } J = \sum_{i \in G} \sum_{j \in N_{ki}} \sum_{h \in S} C_h x_{ijh};$$

Subject to:

$$\tau_{11} \geq A_{11};$$

$$\sum_{h \in S} x_{1jh} = V_{1j}, j \in N_{k1};$$

$$\tau_{11} + \sum_{g=1}^{j} \sum_{h \in S} x_{1gh} / f_h + \Omega \leq T_{1j}, j \in N_{k1};$$

$$\tau_{i1} \geq A_{i1}, i \in G \setminus \{1\};$$

$$\tau_{i1} \geq \tau_{(i-1)1} + \sum_{j \in N_{k(i-1)}} \sum_{h \in S} x_{(i-1)jh} / f_h, i \in G \setminus \{1\};$$

$$\sum_{h \in S} x_{ijh} = V_{ij}, i \in G \setminus \{1\}, j \in N_{ki};$$

$$\tau_{i1} + \sum_{g=1}^{j} \sum_{h \in S} x_{igh} / f_h + \Omega \leq T_{ij}, j \in N_{ki}, i \in G \setminus \{1\};$$

$$x_{ijh} \geq 0 \text{ and } \tau_{i1} \geq 0;$$

wherein:
n is the number of sets of machines usable at each pumping station;
$S = \{1, 2, \ldots, n\}$ is a set of the number of sets of machines;
d is a number of groups of DTSs;
$G = \{1, 2, \ldots, d\}$;
$N_{ki} = \{1, 2, \ldots, ki\}$;
$DTS_{ij}$ is a j-th DTS in Group $i \in G$ and $j \in N_{ki}$ that is decided by a predetermined schedule;
$G_i = \{DTS_{i1}, DTS_{i2}, DTS_{i(ki)}\}$;
$V_{ij}$ is an amount of oil to be transported in $DTS_{ij}$;
$TK_{ij}$ is a charging tank to be charged by performing $DTS_{ij}$ that is decided in the given schedule;
$A_{ij}$ is a time point when $TK_{ij}$ starts to be charged by performing $DTS_{ij}$ as given by the schedule;
$B_{ij}$ is a time point when charging $TK_{ij}$ ends as given by the schedule;
$T_{ij}$ is a time point when $TK_{ij}$ charged by performing $DTS_{ij}$ begins to feed a distiller as given by the schedule;
$\Omega$ is an oil residency time;
$f_i$ is a most energy-effective oil transportation flow rate when i sets of machines are used at each pumping station;
$C_i$ is a cost coefficient when i sets of machines are used at each pumping station;
$x_{ijh}$ is an amount of oil in $DTS_{ij}$ to be transported by using the most energy-efficient flow rate with h sets of machines being used at each pumping station, $i \in G$, $j \in N_{ki}$, and $h \in S$; and $\tau_{i1}$ is a time point when $TK_{i1}$ starts to be charged by performing $DTS_{i1}$ after oil transportation rate is regulated.

BRIEF DESCRIPTION OF THE DRAWINGS

Embodiments of the present invention are described in more detail hereinafter with reference to the drawings, in which.

DETAILED DESCRIPTION

In the following description, a method for scheduling crude oil operations in refinery for energy efficiency optimization is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It is commonly recognized that, to be competitive in a global market, an oil refinery should be well operated. Since the scheduling problem of a refinery is extremely complicated and challenging, much attention has been paid to this issue. In this research field, the main focus is on finding an efficient approach such that a scheduling problem is computationally solvable. In the existing methods, the objectives include maximizing productivity, minimizing oil inventory, minimizing changeover, and so on. However, no much work is found to take energy efficiency as an objective in scheduling an oil refinery. Due to the great effect of greenhouse on the global climate, an enterprise is required to be sustainable, i.e., energy efficiency is vitally important. The present invention addresses this issue in scheduling a refinery.

In a previous work, one presents a control-theoretic-based approach to the scheduling problem of crude oil operations, by which a schedule can be efficiently found. Based on the approach, the present invention studies the energy efficiency problem in crude oil operations. A linear programming-based method is proposed such that the problem can be efficiently solved. A real-world industrial study shows that, by the proposed method, significant energy can be saved.

Section A briefly introduces the process of crude oil operations and its short-term scheduling problem. Section B states the energy optimization problem in crude oil operations and presents the linear programming formulation for it. A real-world industrial case study is given to demonstrate the application and significance of the proposed method in Section C.

A. The Process and its Short-Term Schedule

Figure 1:
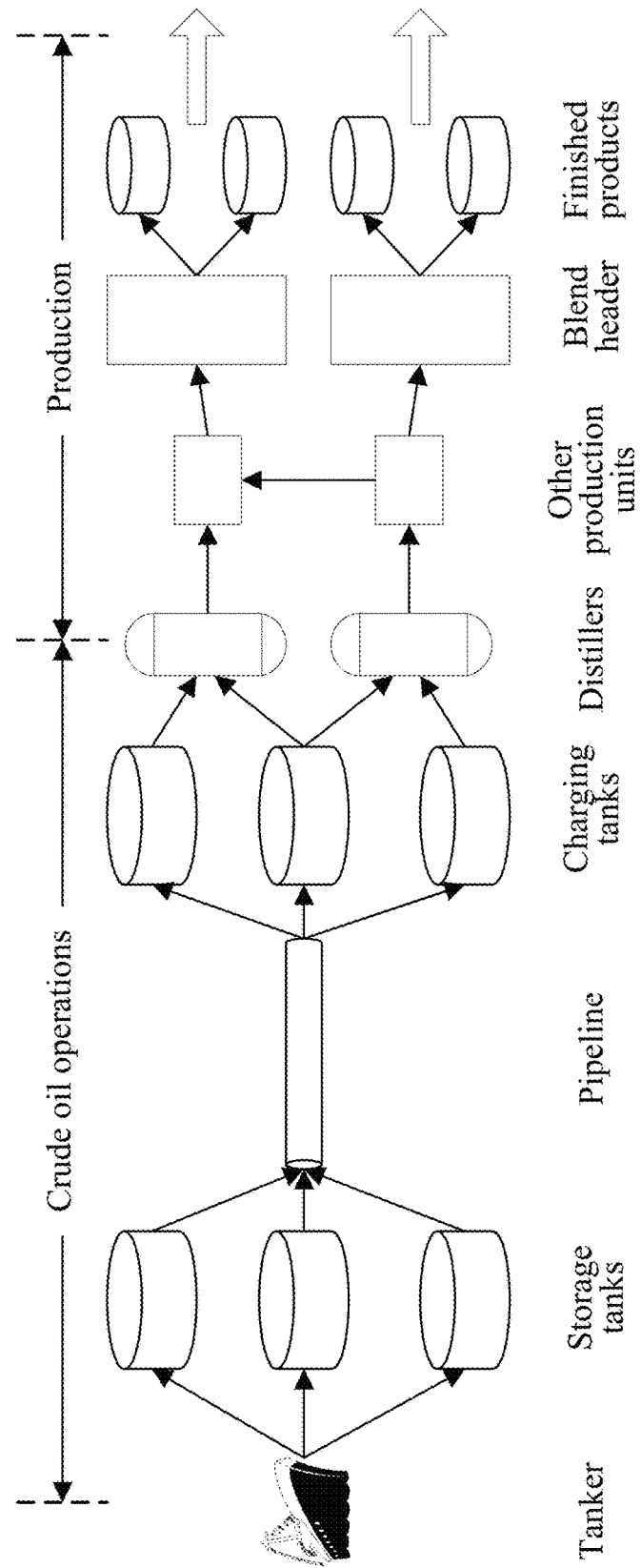
FIG. 1 depicts the illustrative view of a general oil refinery.

Before presenting the problem discussed in the present invention and the method for it, one briefly introduces the processes of a refinery. An illustrative view of general/typical oil refinery processes can be depicted in FIG. 1. A refinery contains a number of storage tanks located at a port near the plant, a pipeline, a number of charging tanks in the plant, a number of distillers for oil distillation, and a variety of other production units. In the viewpoint of operations, there are two phases: 1) crude oil operations and 2) production. Crude oil arrives at the port through oil tankers by sea. It is then unloaded into storage tanks From the storage tanks, oil is delivered to charging tanks through the pipeline. Charging tanks are used to feed oil to the distillers for distillation. This process forms the first phase, called crude oil operations. The products obtained from distillation are further processed by other production units to obtain various components. These components are blended to form the final products, which is the production phase. A short-term scheduling problem for the process of crude oil operations is well recognized as being the most difficult in a refinery. That answers why one finds no implementable theory and software tools to enable industrial-size applications.

To meet the market demands, a refinery should process a number of crude oil types with different components. Each distiller can process some crude oil types, but not all, which in turn requires a tank (storage or charging tank) to hold one oil type at any time. Before oil can be processed by a distiller, brine must be separated from oil. To do so, it requires that, after filling a storage or charging tank, crude oil must stay in it for some time before it can be discharged. This is called an oil residency time constraint. Besides, any tank cannot be charged and discharged simultaneously. There is another requirement that a distiller must work continuously and cannot be stopped unless there is a planned maintenance. The above requirements pose a large number of constraints on the process of crude oil operations.

To schedule the process of crude oil operations is to decide the tasks to be performed and sequence them. A task is a discrete event for the process. In the execution of a task, oil is delivered in a continuous way, resulting in a hybrid system with both discrete-event and continuous processes. When a task is executed, the system is transformed from a state to another such that a task can be seen as a control command. Thus, the scheduling problem of crude oil operations is to determine the commands (tasks) and can be studied from a perspective of hybrid system control, as done in [Wu et al., 2008a, 2009, 2010a and b, 2011, 2012, and 2015a and b]. By the control-theoretic-based approach, a task is defined as follows.

Definition 2.1:

A task (TS) is defined as TS={OT, SP, DP, V, $\alpha$, $\beta$}, where OT denotes an oil type; SP the source from which the oil comes, DP the device to which the oil is delivered; V the amount of oil to be processed; and $\alpha$ and $\beta$ the start and end time points for a task.

For easy implementation and simplicity for finding a schedule, the oil delivering rate in a task is set to be a constant, i.e., $f=V/(\beta-\alpha)$. In crude oil operations, there are three types of TSs: UTSs for oil unloading from a tanker to storage tanks, DTSs for oil delivering from storage tanks to charging tanks, and FTSs for oil feeding to distillers. With the definition of TSs, a short-term schedule SCHD for crude oil operations can be described as $$SCHD=\{UTS_1, UTS_2, \ldots, UTS_w, DTS_1, \\ DTS_2, \ldots, DTS_x, FTS_1, FTS_2, \ldots, FTS_k\} \quad (2.1)$$

Figure 2:
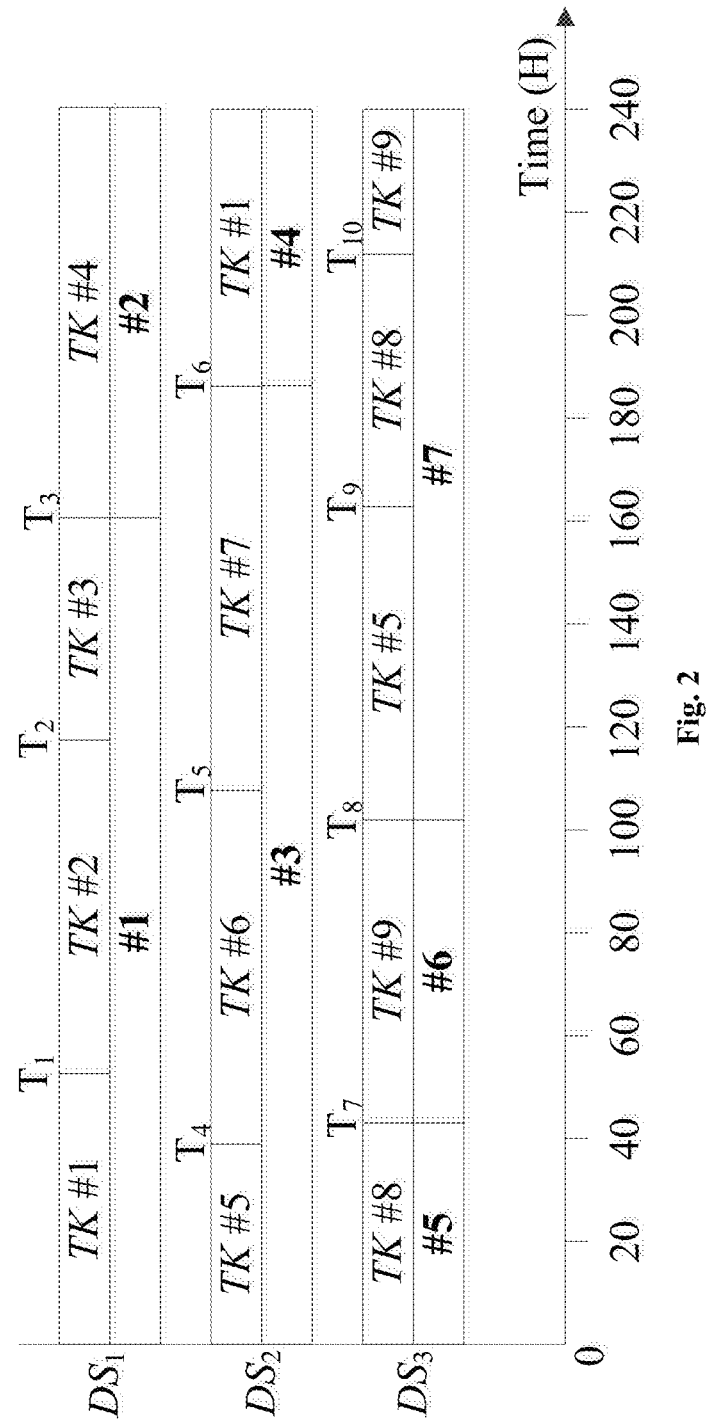
FIG. 2 depicts the Gantt chart for distiller feeding schedule.
Figure 3:
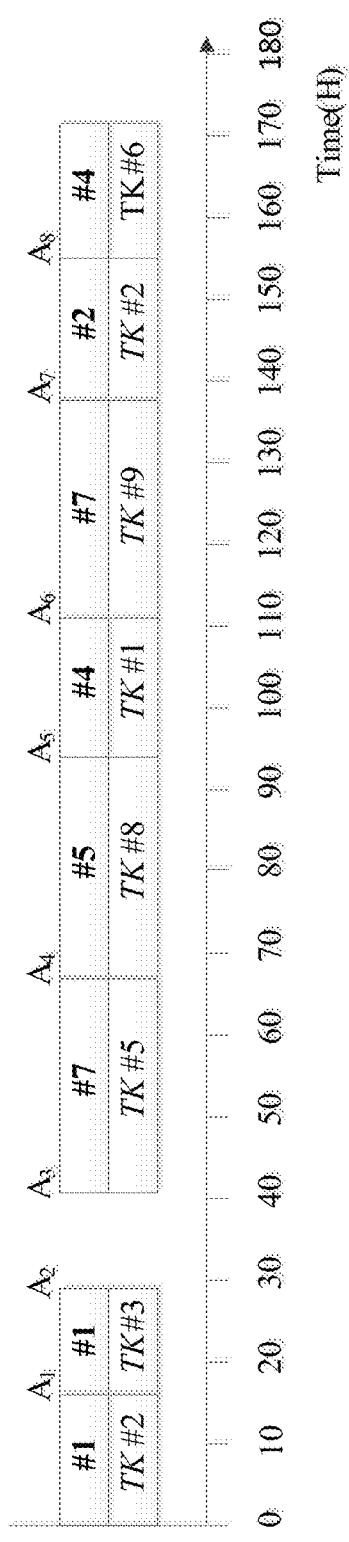
FIG. 3 depicts the Gantt chart for oil transportation schedule via a pipeline.

Thus, the scheduling problem of crude oil operations is to find an SCHD such that all the aforementioned requirements and constraints are met, while some objectives are optimized. By maximizing the oil flow rate of a pipeline, such a schedule can be efficiently found by the control-theoretic-based approach to optimize productivity and oil type processing effectiveness [Wu et al., 2008a, 2009, and 2012]. A schedule for a scenario from a refinery obtained by using this approach is shown in FIGS. 2 and 3, where $DS_i$ represents Distiller i. In FIG. 2, distiller feeding schedule is given by presenting the case when a charging tank is used to feed a type of oil into a distiller. For example, during time interval $[0, T_1]$, Charging Tank #1 is used to feed Oil Type #1 into Distiller 1. While, in FIG. 3, an oil transportation schedule from storage tanks to charging tanks is given by presenting the case when a type of oil is charged into a charging tank. For instance, during time $[0, A_1]$, Oil Type #1 is charged into Charging Tank #2.

By observing the schedule shown in FIG. 3, during time $[A_2, A_3]$, the pipeline is stopped and no oil is transported. Note that, in transporting oil via the pipeline, the oil flow resistance is proportional to the square of the oil velocity. This implies that the higher the oil flow rate in the pipeline is, the more energy is consumed. Thus, when there is idle time for the pipeline, one may reduce the oil flow rate to save energy if the obtained schedule is still feasible. Also, the transportation of some oil parcels can be delayed by reducing the oil flow rate without affecting the distiller feeding schedule. In this way, energy consumption can be further reduced. The problem is coped with in the next section.

B. Problem Formulation and Solution Method

As aforementioned, to find a schedule for crude oil operations is to decide a series of TSs and, by the control-theoretic-based approach, the oil delivering rate for each TS is set to be a constant. Since the scheduling problem of crude oil operations is extremely complicated, it is difficult to efficiently find such a schedule by optimizing productivity and energy consumption simultaneously. However, with the maximal oil transportation rate via a pipeline, a schedule to maximize the productivity can be efficiently found, but the obtained schedule may not be energy-efficient. Based on such a schedule, this section discusses how to optimize energy consumption by regulating the oil transportation rate in the obtained DTSs.

B.1 Problem Statement

Given a schedule with maximal oil transportation rate for DTSs, to minimize energy consumption, one examines whether some parcels of oil in the DTSs can be delayed without impact on the feasibility of the schedule. If so, one can delay the transportation of some parcels by reducing the transportation rate for minimizing the energy consumption.

Figure 4:
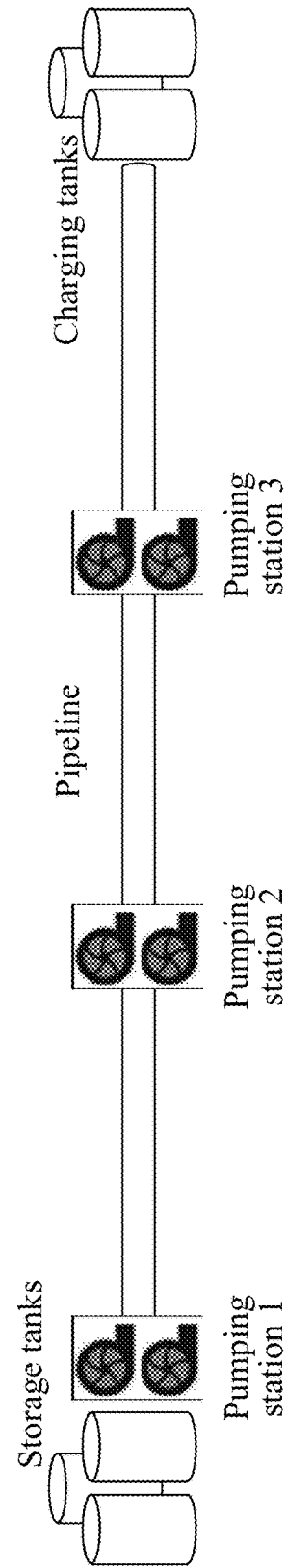
FIG. 4 depicts illustration of a pipeline system.

A pipeline system in a refinery used to transport crude oil from storage tanks to charging tanks can be illustrated by FIG. 4. It is composed of a pipeline and a number of pumping stations that provide the power for the oil transportation. There are a number of sets of machines in each pumping station. The power provided by the system is dependent on the number of sets of machines that are in operation at each station. When the oil transportation rate needs to be increased, one puts more sets of machines in operation. However, the oil transportation rate is not proportional to the number of sets of working machines and is nonlinear. Take an example from a refinery. When one set of machines is used at each pumping station, the transportation rate of the pipeline is 20,000 tons per day. When two sets of machines are used, the rate is 30,000 tons per day. If three sets are used, it is only 33,000 tons per day. With such a nonlinear relationship between the transportation rate and power, it is very complicated to optimize energy consumption for oil transportation.

Figure 5:
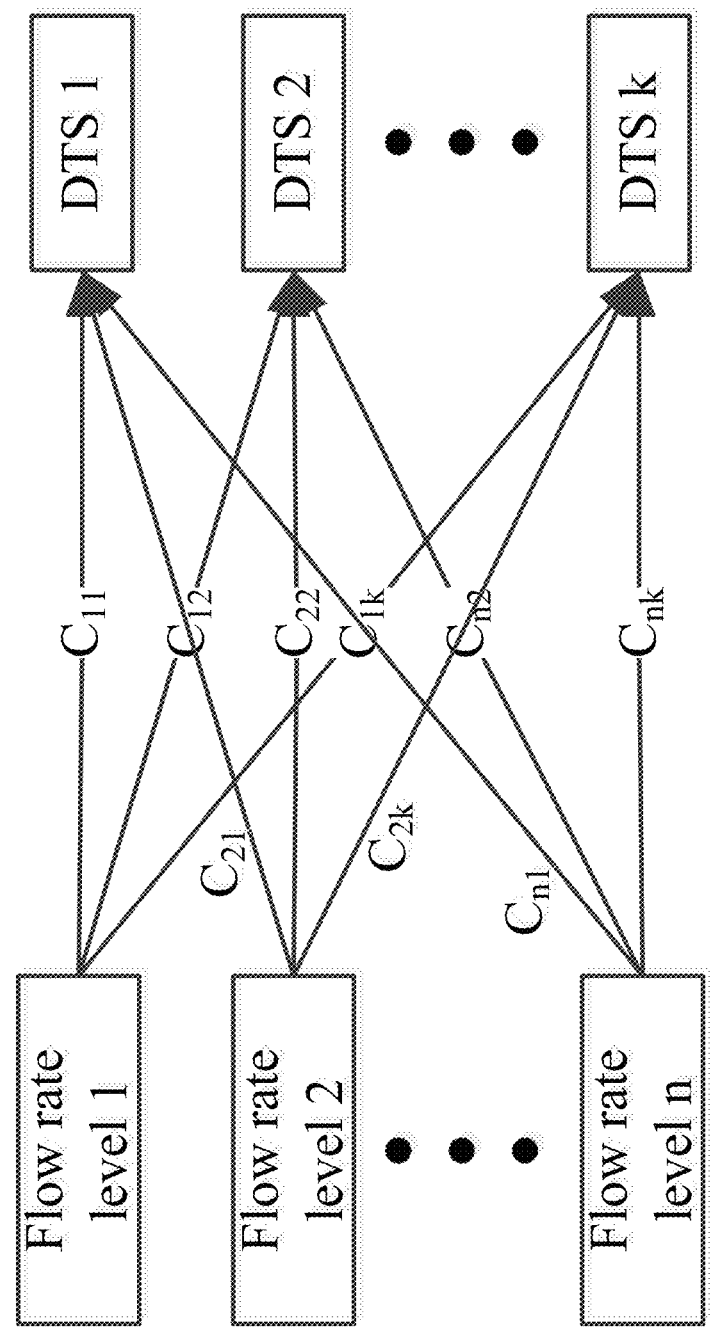
FIG. 5 depicts optimization of energy consumption by regulating the flow rate of DTSs.

It is known that given the number of sets of machines to be used, there is a most energy-efficient oil transportation rate. In other words, to minimize energy consumption, given the number of sets of machines, its corresponding most energy-efficient flow rate should be applied. Hence, there are only several selections on oil transportation rate for the amount oil for each DTS. To do so, given a DTS={OT, SP, DP, V, $\alpha$, $\beta$}, one divides V into n parcels $V_1, V_2, \ldots$, and $V_n$ such that each parcel is delivered with different rate as shown in FIG. 5. Nevertheless, the feasibility needs to be guaranteed, i.e., when a charging tank is scheduled to be charged, it must be emptied, and when the oil in a charging tank is scheduled to be fed into a distiller, the oil residency constraint must be satisfied. Specifically, for the schedule given in FIGS. 2 and 3, by regulating the oil transportation rate of DTSs, Charging Tank #5 can be charged only after time point $T_4$ and its charging should be ended Q time units earlier than time point $T_8$ with Q being the oil residency time.

In summary, to minimize energy consumption for oil transportation via a pipeline, for each DTS={OT, SP, DP, V, $\alpha$, $\beta$}, one needs to optimally divide V into n parcels $V_1$, $V_2, \ldots$, and $V_n$ such that they are transported with flow rate level 1, 2, $\ldots$, and n, respectively. A linear programming-based method can be developed to achieve this purpose.

B.2 a Linear Programming-Based Method

Given a short-term schedule for crude oil operations obtained by the control-theoretic-based approach, assume that there are k DTSs, each of which is used to charge a charging tank. These DTSs are sequenced such that DTS i+1 should be performed just after DTS i. Then, these DTSs are divided into d groups such that, in group $G_i$, there are ki DTSs with k1+k2+ . . . +kd=k. One uses $DTS_{ij}$ to denote the j-th DTS in group $G_i$, and $A_{ij}$ and $B_{ij}$ to denote time points when $DTS_{ij}$ starts to charge a charging tank and ends the charging, respectively. Note that $A_{ij}$ and $B_{ij}$ are given by the schedule obtained by the control-theoretic-based approach, i.e., they are known. Then, for the grouping, one has $B_{ij}=A_{i(j+1)}$, i.e., in the same group, the DTSs are performed one after another without interruption. However, $B_{i(ki)}<A_{(i+1)1}$ must hold. In other words, between groups $G_i$ and $G_{(i+1)}$, the pipeline is schedule to be idle for some time. Based on this grouping of DTSs, one presents the following notations to formulate the considered problem.

Parameters and sets n: the number of sets of machines usable at each pumping station;

h∈S={1, 2, . . . , n}: the set of the number of sets of machines n usable at each pumping station;

d: the number of groups of DTSs;

G={1, 2, . . . , d};

j∈$N_{ki}$={1, 2, . . . , ki};

$DTS_{ij}$: the j-th DTS in Group i∈G and j∈$N_{ki}$ that is decided by a given schedule;

$G_i$={$DTS_{i1}$, $DTS_{i2}$, . . . , $DTS_{i(ki)}$};

$V_{ij}$: the amount of oil to be transported in $DTS_{ij}$;

$TK_{ij}$: the charging tank to be charged by performing $DTS_{ij}$ that is decided in the given schedule;

$A_{ij}$: the time point when $TK_{ij}$ starts to be charged by performing $DTS_{ij}$ as given by the schedule;

$B_{ij}$: the time point when the charging of $TK_{ij}$ ends as given by the schedule;

$T_{ij}$: the time point when $TK_{ij}$ charged by performing $DTS_{ij}$ begins to feed a distiller as given by the schedule;

$\Omega$: the oil residency time;

$f_i$: the most energy-effective oil transportation flow rate when i sets of machines are used at each pumping station;

$C_i$: the cost coefficient when i sets of machines are used at each pumping station;

Decision Variables $x_{ijh}$: the amount of oil in $DTS_{ij}$ to be transported by using the most energy-efficient flow rate with h sets of machines being used at each pumping station, $i \in G$, $j \in N_{ki}$, and $h \in S$;

$\tau_{i1}$: the time point when $TK_{i1}$ starts to be charged by performing $DTS_{i1}$ after oil transportation rate is regulated.

Given a schedule obtained by the control-theoretic-based approach, the above listed sets and parameters are known except $C_i$. To formulate the addressed problem, one needs to determine $C_i$. Assume that one unit power is consumed per one time unit when one set of machines is used at each pumping station. Then, when n sets of machines are used, the power consumed per one time unit is n units. Thus, the power consumed for transporting one unit of crude oil via a pipeline is $n/f_n$, i.e., $C_n = n/f_n$ is the cost coefficient. Then, one formulates the problem as follows.

$$\text{Minimize } J = \sum_{i \in G} \sum_{j \in N_{ki}} \sum_{h \in S} C_h x_{ijh} \quad (3.1)$$

Subject to $$\tau_{11} \geq A_{11} \quad (3.2)$$

$$\sum_{h \in S} x_{1jh} = V_{1j}, \, j \in N_{k1} \quad (3.3)$$

$$\tau_{11} + \sum_{g=1}^{j} \sum_{h \in S} x_{1gh}/f_h + \Omega \leq T_{1j}, \, j \in N_{k1} \quad (3.4)$$

$$\tau_{i1} \geq A_{i1}, \, i \in G \setminus \{1\} \quad (3.5)$$

$$\tau_{i1} \geq \tau_{(i-1)1} + \sum_{j \in N_{k(i-1)}} \sum_{h \in S} x_{(i-1)jh}/f_h, \, i \in G \setminus \{1\} \quad (3.6)$$

$$\sum_{h \in S} x_{ijh} = V_{ij}, \, i \in G \setminus \{1\}, \, j \in N_{ki}, \quad (3.7)$$

$$\tau_{i1} + \sum_{g=1}^{j} \sum_{h \in S} x_{igh}/f_h + \Omega \leq T_{ij}, \, j \in N_{ki}, \, i \in G \setminus \{1\} \quad (3.8)$$

$$x_{ijh} \geq 0 \text{ and } \tau_{i1} \geq 0 \quad (3.9)$$

Since $C_n$ represents the power consumed for transporting one unit of crude oil, by Objective (3.1), the total energy consumption is minimized by regulating oil transportation rate. Constraint (3.2) guarantees that oil transportation can be done when a charging tank is available as specified by the given schedule. Constraint (3.3) states the conservativeness property of crude oil in a DTS. Constraint (3.4) guarantees that the time delay by regulating the oil transportation is in a permissive arrange such that the oil residency time constraint is satisfied. Constraint (3.9) presents the non-negative requirement.

As above discussed, between two Groups $G_{(i-1)}$ and $G_i$, there is an idle time, or one has $A_{i1} > B_{(i-1)(k(i-1))}$. However, after delaying the transportation of oil of DTSs in $G_{(i-1)}$, this may no longer hold. Since a pipeline cannot be used to perform two DTSs simultaneously, a DTS in $G_i$ can be performed only after all the DTSs in $G_{(i-1)}$ have been executed. Constraints (3.5) and (3.6) state that when a DTS in $G_i$ is performed, the pipeline is available, and at the same time, charging tank $TK_{i1}$ that is necessary for performing $DTS_{i1}$ is released. Constraints (3.7) and (3.8) have the same meaning as that of (3.3) and (3.4).

Notice that the domain of $x_{ijh}$'s and $\tau_{i1}$'s is real number, and the objective and constraints are linear. Hence, this is a linear programming formulation and can be efficiently solved by commercial software tools.

C. Industrial Case Study

This section uses a real-life scenario from a refinery in China to show the application of the proposed method. The refinery is located at the southern China and is one of the largest refineries in China. It has three distillers and a pipeline for delivering oil from storage tanks to charging tanks. These distillers are designed for different types of oil, multiple types of oil should be processed. The distance from the storage tanks to charging tanks is about 20 kilometers, so is the pipeline. The maximal oil processing capacity of the three distillers is 375 tons, 230 tons, and 500 tons per hour, respectively. For the pipeline, there are three sets of machines at each pumping station. If one set, two sets, and three sets of machines are put into operation, the corresponding most energy-efficient oil transportation rate via the pipeline is 20,000 tons, 30,000 tons, and 33,000 tons per day (or 833.333 tons, 1250 tons, and 1375 tons per hour), respectively.

Figure 6:
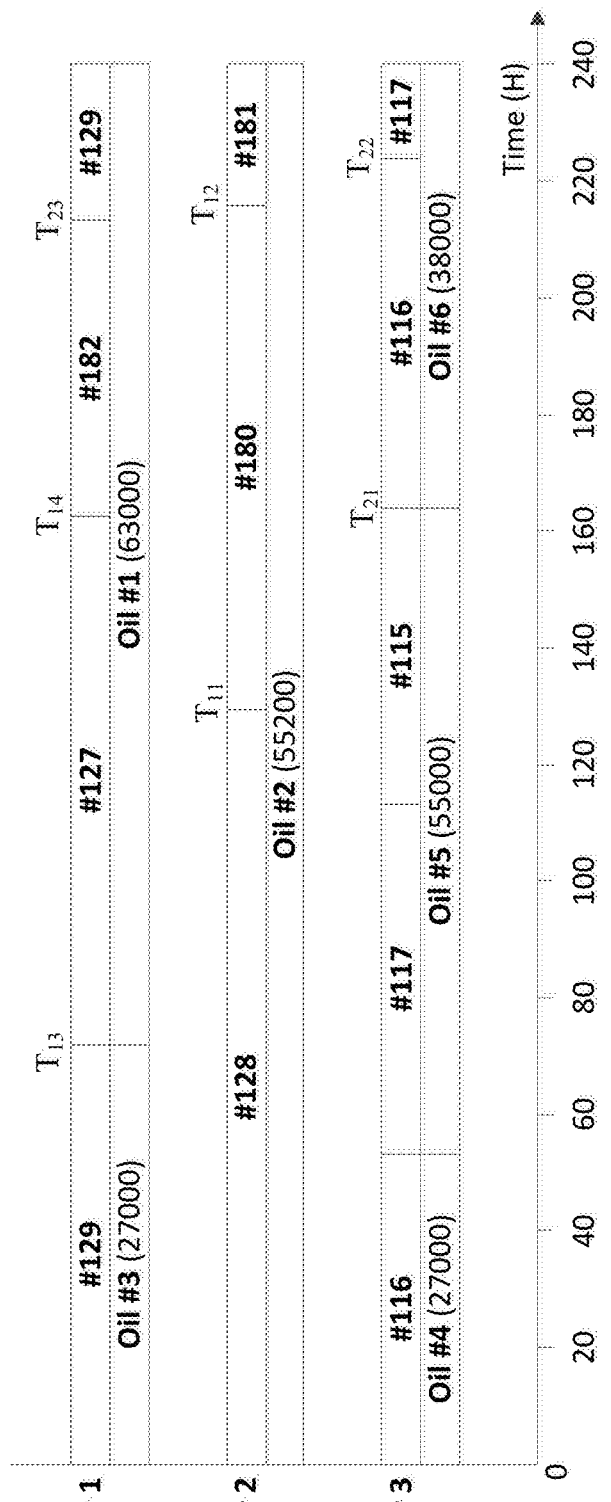
FIG. 6 depicts the distiller feeding schedule for the case problem.
Figure 7:
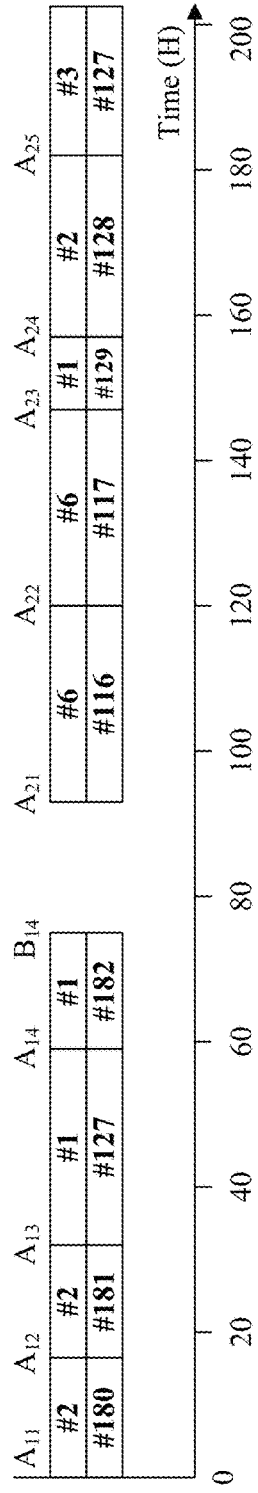
FIG. 7 depicts the oil transportation schedule for the case problem.

As a routine, the refinery needs to present a short-term schedule every 10 days. The case presented here is one of the scenarios and a schedule is found by the control-theoretic-based method [Wu et al., 2008a, 2009, and 2012]. For the case problem, since the total oil processing capacity is 375+230+500=1105 tons per hour that is less than 1250 tons per hour by using two sets of machines at each pumping station, one can treat 1250 tons per hour as the maximal oil transportation rate via the pipeline for scheduling the process. In this way, the obtained schedule is shown in FIGS. 6 and 7.

For the obtained schedule, there are nine DTSs and they form two groups with $G_1 = \{DTS_{12}, DTS_{13}, DTS_{14}\}$ and $G_2 = \{DTS_{21}, DTS_{22}, DTS_{23}, DTS_{24}, DTS_{25}\}$. Note that, among the DTSs, the oil transported to Charging Tanks #128 and #127 by performing $DTS_{24}$, $DTS_{25}$ is not processed during the current scheduling horizon but for the next horizon and the time when it is processed is unknown. Hence, one does not need to consider these two DTSs for energy reduction.

From the given schedule, by ST standing for storage tanks, one has $DTS_{11} = \{\#2, ST, \#180, 20000, 0, 16\}$, $DTS_{12} = \{\#2, ST, \#181, 20000, 16, 32\}$, $DTS_{13} = \{\#1, ST, \#127, 34000, 32, 59.2\}$, $DTS_{14} = \{\#1, ST, \#182, 20000, 59.2, 75.2\}$, $DTS_{21} = \{\#6, ST, \#116, 34000, 92.8, 120\}$, $DTS_{22} = \{\#6, ST, \#117, 34000, 120, 147.2\}$, $DTS_{23} = \{\#1, ST, \#129, 9000, 147.2, 154.4\}$, $T_{11} = 130.4$ hour, $T_{12} = 217.4$, $T_{13} = 72$, $T_{14} = 162.7$, $T_{21} = 164$, $T_{22} = 232$, and $T_{23} = 216.03$. Also by definition, one has $C_1 = 1/f_1 = 0.0012$ and $C_2 = 2/f_2 = 0.0016$. For this case problem, one has $\Omega = 6$ hours. Then, one can formulate the linear programming model for the problem as follows.

Figure 8:
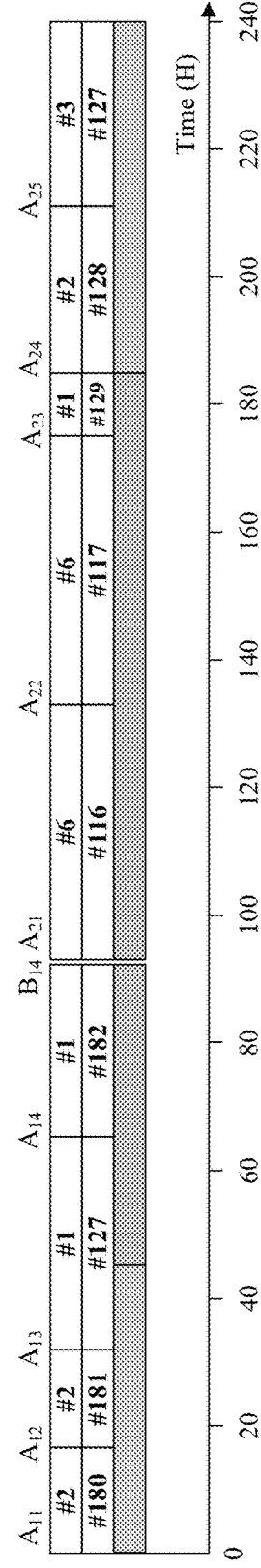
FIG. 8 depicts the Gantt chart for the optimized oil transportation schedule.

Minimize $J = C_1 \times (x_{111} + x_{121} + x_{131} + x_{141} + x_{211} + x_{221} + x_{231}) + C_2 \times (x_{112} + x_{122} + x_{132} + x_{142} + x_{212} + x_{222} + x_{232})$ subject to $\tau_{11} \geq 0$ $x_{111} + x_{112} = 20000$ $\tau_{11} + x_{111}/833.333 + x_{112}/1250 + 6 \leq 130.4$ $x_{121}+x_{122}=20000$ $\tau_{11}+x_{111}/833.333+x_{112}/1250+x_{121}/833.333+x_{122}/1250+6 \leq 217.4$ $x_{131}+x_{132}=34000$ $\tau_{11}+x_{111}/833.333+x_{112}/1250+x_{121}/833.333+x_{122}/1250+x_{131}/833.333+x_{132}/1250+6 \leq 72$ $x_{141}+x_{142}=20000$ $\tau_{11}+x_{111}/833.333+x_{112}/1250+x_{121}/833.333+x_{122}/1250+x_{131}/833.333+x_{132}/1250+x_{141}/833.333+x_{142}/1250+6 \leq 162.7$ $\tau_{21} \geq \tau_{11}+x_{111}/833.333+x_{112}/1250+x_{121}/833.333+x_{122}/1250+x_{131}/833.333+x_{132}/1250+x_{141}/833.333+x_{142}/1250$ $\tau_{21} \geq 92.8$ $x_{211}+x_{212}=34000$ $\tau_{21}+x_{211}/833.333+x_{212}/1250+6 \leq 164$ $x_{221}+x_{222}=34000$ $\tau_{21}+x_{211}/833.333+x_{212}/1250+x_{221}/833.333+x_{222}/1250+6 \leq 232$ $x_{231}+x_{232}=9000$ $\tau_{21}+x_{211}/833.333+x_{212}/1250+x_{221}/833.333+x_{222}/1250+x_{231}/833.333+x_{232}/1250+6 \leq 216.03$ $x_{ijh} \geq 0$ and $\tau_{i1} \geq 0$ This problem is solved by using CPLEX with $x_{111}=x_{121}=x_{141}=x_{212}=x_{222}=x_{232}=0$, $x_{112}=20000$, $x_{122}=20000$, $x_{131}=17000$, $x_{132}=17000$, $x_{141}=20000$, $x_{211}=34000$, $x_{221}=34000$, and $x_{231}=9000$. The obtained schedule is illustrated by the Gantt chart in FIG. 8, where an orange bar presents that the oil is transported by using two sets of machines, while a green bar represents that one set of machine is used. By this schedule, $A_{ij}$'s and $B_{ij}$'s are modified as $A_{12}=16$, $A_{13}=32$, $A_{14}=66$, $B_{14}=90$, $A_{21}=92.8$, $A_{22}=133.6$, $A_{23}=174.4$, and $A_{24}=185.2$ such that it is feasible. Notice that $A_{14}+6=72=T_{13}$ to guarantee that the Oil Type #1 charged to Charging Tank #117 is usable at time $T_{13}$. To do so, Oil Type #2 charged into Charging Tanks #180 and #181, and part of Oil Type #1 charged to #117 should be transported by using two sets of machines, otherwise an obtained schedule is infeasible.

By the obtained schedule, one has J=228. However, by the schedule given in FIG. 8, one has J=273.6. This implies that the objective is reduced by (273.6−228)/273.6≈16.7%, i.e., significant energy is saved.

There are high fusion oil types whose fusion point is higher than 30° C. Hence, when such oil types are transported from one place to another via a pipeline, they need to be heated. Then, they are stored in tanks and cool down. When they are to be processed, they need to be heated again. Also, when the middle products come just from a device, they are very hot. Then, they are stored in tanks and cool down. However, when they go to the next processing step, they need to heat up. In this way, large amount of energy is consumed, which can be greatly saved if the operations are properly scheduled.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but is not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for scheduling a crude oil operation process in a refinery, the oil operation process, based on a predetermined short-term schedule as determined by a control-theoretic-based approach, comprising a plurality of tasks $DTS_s$ for oil delivering from a plurality of storage tanks to a plurality of charging tanks $TK_{ij}$ for maximizing productivity, the refinery comprising a pipeline system used to transport an amount of crude oil $V_{ij}$ from the plurality of storage tanks to the plurality of charging tanks $TK_{ij}$ to be charged by performing a task $DTS_{ij}$ from a time point Aij to a time Bij for feeding the amount of crude oil Vij to a distiller, the pipeline system comprising a pipeline and a number of pumping stations, and a number of sets of machines n usable at each of the pumping stations, the method comprising:

dividing, by a processor, the amount of crude oil Vij into a plurality of parcels such that the amount of crude oil Vij can be transported by the task DTSij by feeding the plurality of parcels each with a different flow rate; and determining, by a processor, the number of sets of machines n usable at each of the pumping stations such that an energy consumption J for the process is minimized under a plurality of constraints based on a linear programming model, subject to:

$$J = \sum_{i \in G} \sum_{j \in N_{ki}} \sum_{h \in S} C_h x_{ijh};$$

$$\tau_{11} \geq A_{11};$$

$$\sum_{h \in S} x_{1jh} = V_{1j};$$

$$\tau_{11} + \sum_{g=1}^{j} \sum_{h \in S} x_{1gh}/f_h + \Omega \leq T_{1j};$$

$$\tau_{i1} \geq A_{i1};$$

$$\tau_{i1} \geq \tau_{(i-1)1} + \sum_{j \in N_{k(i-1)}} \sum_{h \in S} x_{(i-1)jh}/f_h;$$

$$\sum_{h \in S} x_{ijh} = V_{ij};$$

$$\tau_{i1} + \sum_{g=1}^{j} \sum_{h \in S} x_{igh}/f_h + \Omega \leq T_{ij};$$

$$x_{ijh} \geq 0 \text{ and } \tau_{i1} \geq 0;$$

wherein:

n is the number of sets of machines usable at each pumping station;

h∈S={1, 2, ..., n} is a set of the number of sets of machines n;

d is a number of groups of DTSs;

G={1, 2, ..., d} is a set of the number of groups of DTSs d;

i∈G\{1};

j∈N_{ki}={1, 2, ..., ki};

$DTS_{ij}$ is a j-th DTS in Group i∈G and j∈N_{ki} that is decided by the predetermined short-term schedule;

$G_i$={$DTS_{i1}$, $DTS_{i2}$, ..., $DTS_{i(ki)}$};

$A_{ij}$ is the time point when $TK_{ij}$ starts to be charged by performing $DTS_{ij}$ as given by the predetermined short-term schedule;

$B_{ij}$ is the time point when the charging of $TK_{ij}$ ends as given by the predetermined short-term schedule;

$T_{ij}$ is a time point when $TK_{ij}$ charged by performing $DTS_{ij}$ begins to feed a distiller as given by the predetermined short-term schedule;

Ω is an oil residency time;

$f_i$ is a most energy-effective oil transportation flow rate when i sets of machines are used at each pumping station;

$C_i$ is a cost coefficient when i sets of machines are used at each pumping station;

$x_{ijh}$ is an amount of oil in $DTS_{ij}$ to be transported by using the most energy-efficient flow rate with h sets of machines being used at each pumping station; and $\tau_{i1}$ is a time point when $TK_{i1}$ starts to be charged by performing $DTS_{i1}$ after oil transportation rate is regulated, the linear programming model executed in a solver software and finding an optimized schedule with minimized power consumption based on the determined number of sets of machines n, and applying the optimized schedule to the refinery system to perform the plurality of tasks for delivering oil from the plurality of storage tanks to the plurality of charging tanks.

2. The method of claim 1, wherein the $C_h$ is given by $h/f_h$.

3. The method of claim 1, wherein the energy consumption is minimized by regulating oil transportation rate.

4. A non-transitory computer-readable medium whose contents cause a computing system to perform a computer-implemented method for scheduling a crude oil operation process in a refinery, the oil operation process, based on a predetermined short-term schedule as determined by a control-theoretic-based approach, comprising a plurality of tasks DTSs for oil delivering from a plurality of storage tanks to a plurality of charging tanks $TK_{ij}$ for maximizing the productivity, the refinery comprising a pipeline system used to transport an amount of crude oil $V_{ij}$ from the plurality of storage tanks to the plurality of charging tanks $TK_{ij}$ to be charged by performing a task $DTS_{ij}$ from a time point $A_{ij}$ to a time point $B_{ij}$ for feeding the amount of crude oil $V_{ij}$ to a distiller, the pipeline system comprising a pipeline and a number of pumping stations, and a number of sets of machines n usable at each of the pumping stations, the method comprising:

dividing, by a processor, the amount of crude oil Vij into a plurality of parcels such that the amount of crude oil Vij can be transported by the task $DTS_{ij}$ by feeding the plurality of parcels each with a different flow rate; and determining, by a processor, the number of sets of machines n usable at each of the pumping stations such that an energy consumption J for the process is minimized under a plurality of constraints based on a linear programming model, subject to:

$$J = \sum_{i \in G} \sum_{j \in N_{ki}} \sum_{h \in S} C_h x_{ijh};$$

$$\tau_{11} \geq A_{11};$$

$$\sum_{h \in S} x_{1jh} = V_{1j};$$

$$\tau_{11} + \sum_{g=1}^{j} \sum_{h \in S} x_{1gh}/f_h + \Omega \leq T_{1j};$$

$$\tau_{i1} \geq A_{i1};$$

$$\tau_{i1} \geq \tau_{(i-1)1} + \sum_{j \in N_{k(i-1)}} \sum_{h \in S} x_{(i-1)jh}/f_h;$$

$$\sum_{h \in S} x_{ijh} = V_{ij};$$

$$\tau_{i1} + \sum_{g=1}^{j} \sum_{h \in S} x_{igh}/f_h + \Omega \leq T_{ij};$$

$$x_{ijh} \geq 0 \text{ and } \tau_{i1} \geq 0;$$

wherein:

n is the number of sets of machines usable at each pumping station;

h∈S={1, 2, ..., n} is a set of the number of sets of machines n;

d is a number of groups of DTSs;

G={1, 2, ..., d} is a set of the number of groups of DTSs d;

i∈G\{1};

j∈N_{ki}={1, 2, ..., ki};

$DTS_{ij}$ is a j-th DTS in Group i∈G and j∈N_{ki} that is decided by the predetermined short-term schedule;

$G_i$={$DTS_{i1}$, $DTS_{i2}$, ... $DTS_{i(ki)}$}, $A_{ij}$ is the time point when $TK_{ij}$ starts to be charged by performing $DTS_{ij}$ as given by the predetermined short-term schedule;

$B_{ij}$ is the time point when the charging of $TK_{ij}$ ends as given by the predetermined short-term schedule;

$T_{ij}$ is a time point when $TK_{ij}$ charged by performing $DTS_{ij}$ begins to feed a distiller as given by the predetermined short-term schedule;

Ω is an oil residency time;

$f_i$ is a most energy-effective oil transportation flow rate when i sets of machines are used at each pumping station;

$C_i$ is a cost coefficient when i sets of machines are used at each pumping station;

$x_{ijh}$ is an amount of oil in $DTS_{ij}$ to be transported by using the most energy-efficient flow rate with h sets of machines being used at each pumping station; and $\tau_{i1}$ is a time point when $TK_{i1}$ starts to be charged by performing $DTS_{i1}$ after oil transportation rate is regulated, the linear programming model executed in a solver software and finding an optimized schedule with minimized power consumption based on the determined number of sets of machines n, and applying the optimized schedule to the refinery system to perform the plurality of tasks for delivering oil from the plurality of storage tanks to the plurality of charging tanks.

5. The non-transitory computer-readable medium of claim 4, wherein the $C_h$ is given by $h/f_h$.

6. The non-transitory computer-readable medium of claim 4, wherein the energy consumption is minimized by regulating oil transportation rate.

* * * * *